W. W. DEAN.
MAGNETO ELECTRIC MACHINE.
APPLICATION FILED OCT. 20, 1910.
983,029.
Patented Jan. 31, 1911.
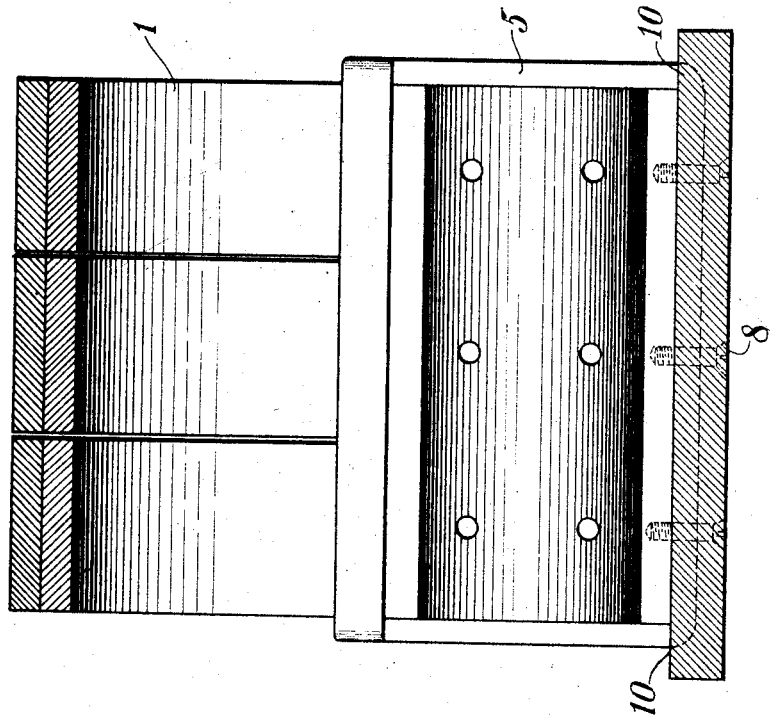
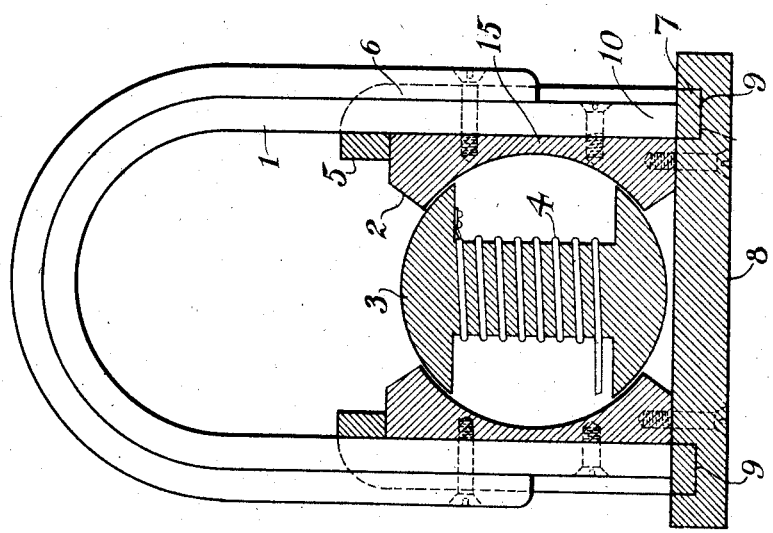
Witnesses
Edgar A. Spurr
Mary Malley
Inventor
William W. Dean
By J. O. Richey
His Attorney

UNITED STATES PATENT OFFICE.

WILLIAM W. DEAN, OF ELYRIA, OHIO, ASSIGNOR TO THE DEAN ELECTRIC COMPANY, OF ELYRIA, OHIO, A CORPORATION OF OHIO.

MAGNETO-ELECTRIC MACHINE.

983,029.

Specification of Letters Patent. Patented Jan. 31, 1911.

Original application filed January 28, 1910, Serial No. 540,539. Divided and this application filed October 20, 1910. Serial No. 588,158.

*To all whom it may concern:*

Be it known that I, WILLIAM W. DEAN, a citizen of the United States, residing at Elyria, in the county of Lorain and State of Ohio, have invented certain new and useful Improvements in Magneto-Electric Machines; and I do hereby declare the following to be a full, clear, and exact description of the invention, such as will enable others skilled in the art to which it appertains to make and use the same.

This application is a division of my application 540,539 filed January 28, 1910.

This invention relates to improvements in magneto electric machines, such for example as are employed to generate the current used in ignition systems on self-propelled vehicles, though I do not wish to be limited to this particular use.

The general purposes of my invention are recited in the parent application.

The object of the form of my invention covered by this application is to improve the mechanical details and construction in order to realize economy in manufacturing and construction as well as to produce a more compact and efficient instrument.

My invention will be best understood by reference to the following description when taken in connection with the accompanying illustration showing a specific embodiment thereof, while the scope will be more particularly pointed out in the appended claims.

Figure 1 shows a cross section of my invention. Fig. 2 shows a longitudinal cross section with the armature removed.

At 1 I show a permanent magnet which is bent in the shape of a horseshoe and which serves as the field of the machine.

8 is a base piece which has grooves 9—9 cut therein.

The permanent magnet 1 is mounted upon the base piece with the ends of the magnet over the grooves. Soft iron or steel pole pieces are mounted upon the inside surfaces of the magnet. These pole pieces are convexed as shown at 15. An armature 3 is mounted between the pole pieces and rotates in the convexed portions thereof. An armature coil 4 is wound upon the armature 3. A heavy short circuited copper winding 5 which in the device shown is composed of a single band of metal, is wound around the flux circuit. This band 5 is composed of a portion 11, which extends along the top of the pole piece in the corner formed by the magnet and the pole piece. At the ends of the pole piece, the copper band is bent back as shown at 6 behind the pole piece and extends at the end of the magnet and substantially parallel therewith down to the base to the rear of the pole piece. The band then extends through the grooves underneath the ends of the magnet as shown at 6'. The band serves a double purpose of opposing the change of flux in the flux circuit and of binding the parts together.

In general, the operation is as follows: The magnet, the pole pieces and the armature compose the flux circuit. If there is any effort to change the flux in the circuit, such change will generate a current in the winding 5, which will set up a counter-flux opposing the main flux.

I claim—

1. In a magneto electric machine, the combination of a base plate having a groove cut therein, a permanent magnet bent into a horseshoe shape mounted on said base, a soft iron or steel pole piece mounted upon the inside surface of one of the limbs of said horseshoe magnet near the end thereof, a heavy metallic winding passing beneath said pole piece and through the groove in the base, an armature mounted between the poles of said magnet and an armature winding carried by said armature.

2. In a magneto electric machine, the combination of a base plate having a groove cut therein, a permanent horseshoe magnet forming the field thereof, a soft iron or steel pole piece mounted upon the inside surface of said magnet adjacent the end thereof, a heavy metallic winding passing over the top of the pole piece down to the rear of said pole piece and through the groove in the base piece, an armature and an armature coil mounted thereon.

3. In a magneto electric machine, the combination of a permanent horseshoe magnet constituting the field thereof, a base plate upon which said magnet is mounted having a groove cut therein, a soft iron or steel pole piece mounted on the inside of said magnet; a heavy metallic band passing over the top of said pole piece on the inside of the magnet around to the rear of the pole piece and extending substantially parallel to the magnets and through the groove in said base, an armature associated with said pole piece and an armature winding mounted on said armature.

4. In a magneto electric machine, the combination of a base piece having a groove cut therein, a permanent horseshoe magnet forming the field of said machine, soft iron or steel pole pieces mounted upon the inside surface of said magnets, a heavy metallic winding passing over the top of each of said pole pieces and on the inside of said magnet, around behind the pole piece at its ends down substantially parallel to the magnet and behind the pole piece to the groove through which it passes beneath the ends of the magnet, an armature associated with the pole pieces and an armature coil wound upon the armature.

5. In a magneto electric machine, the combination of a base plate having a groove cut therein, a permanent horseshoe magnet forming the field of said machine, said magnet mounted on the base with its ends over the grooves, a soft iron or steel pole piece mounted upon the inside surface of said magnet in the corner between the magnet and the base, a heavy metallic winding passing over the top of the pole piece on the inside of the magnet around behind the pole piece at its ends and extending down the sides of the magnet behind the pole piece to and through the groove beneath the ends of the magnet, an armature mounted to rotate between the ends of the magnets and an armature winding mounted on said armature.

In testimony whereof, I affix my signature in the presence of two witnesses.

WILLIAM W. DEAN.

Witnesses:
F. O. RICHEY,
A. D. T. LIBBY.